US009720761B2

(12) United States Patent
Yu et al.

(10) Patent No.: US 9,720,761 B2
(45) Date of Patent: Aug. 1, 2017

(54) SYSTEM FAULT DETECTION AND PROCESSING METHOD, DEVICE, AND COMPUTER READABLE STORAGE MEDIUM

(71) Applicant: ZTE Corporation, Shenzhen, Guangdong (CN)

(72) Inventors: Guangbo Yu, Shenzhen (CN); Huaiyun Zhu, Shenzhen (CN); Jing Qiu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 22 days.

(21) Appl. No.: 14/781,403

(22) PCT Filed: Jan. 6, 2014

(86) PCT No.: PCT/CN2014/070187
§ 371 (c)(1),
(2) Date: Oct. 30, 2015

(87) PCT Pub. No.: WO2014/161373
PCT Pub. Date: Oct. 9, 2014

(65) Prior Publication Data
US 2016/0055046 A1    Feb. 25, 2016

(30) Foreign Application Priority Data
Apr. 1, 2013   (CN) .......................... 2013 1 0111375

(51) Int. Cl.
*G06F 11/00*   (2006.01)
*G06F 11/07*   (2006.01)
*G06F 11/14*   (2006.01)

(52) U.S. Cl.
CPC ........ *G06F 11/079* (2013.01); *G06F 11/0715* (2013.01); *G06F 11/0751* (2013.01);
(Continued)

(58) Field of Classification Search
USPC ............................................ 714/55
See application file for complete search history.

(56) References Cited

U.S. PATENT DOCUMENTS 8,448,029 B2 *   5/2013   Snead ................. G06F 11/0724
                                                              714/55
2004/0003317 A1   1/2004   Kwatra
(Continued)

FOREIGN PATENT DOCUMENTS

CN         101196836 A       6/2008
CN         101221518 A       7/2008
(Continued)

OTHER PUBLICATIONS

Supplementary European Search Report in European application No. 14779970.4, mailed on Apr. 5, 2016.
(Continued)

*Primary Examiner* — Sarai Butler
(74) *Attorney, Agent, or Firm* — Oppedahl Patent Law Firm LLC

(57) ABSTRACT

Disclosed are a method, a device, and a computer readable storage medium for detecting and processing a system fault. The method includes: an interrupt service routine sending a first stage kicking dog signal, and receiving a second stage kicking dog signal for a system detection task (S101); and when task dead loop or task abnormity is detected, performing system abnormity processing according to a preset processing policy, wherein when the interrupt service routine fails to receive the second stage kicking dog signal within a set period of time, the interrupt service routine stops sending the first stage kicking dog signal, and the system reboots (S102).

17 Claims, 1 Drawing Sheet

(52) U.S. Cl.
CPC ...... *G06F 11/0757* (2013.01); *G06F 11/1417* (2013.01); *G06F 2201/85* (2013.01)

(56) References Cited

U.S. PATENT DOCUMENTS

2006/0277448 A1* 12/2006 Koto .................. G06F 11/1417
714/55
2010/0306602 A1* 12/2010 Kamiya ............. G06F 11/0757
714/56

FOREIGN PATENT DOCUMENTS

| | | |
|---|---|---|
| CN | 101452420 A | 6/2009 |
| CN | 101561778 A | 10/2009 |
| CN | 102141947 A | 8/2011 |

OTHER PUBLICATIONS

International Search Report in international application No. PCT/CN2014/070187, mailed on Mar. 27, 2014.
English Translation of the Written Opinion of the International Search Authority in international application No. PCT/CN2014/070187, mailed on Mar. 27, 2014.

* cited by examiner

SYSTEM FAULT DETECTION AND PROCESSING METHOD, DEVICE, AND COMPUTER READABLE STORAGE MEDIUM

TECHNICAL FIELD

The present disclosure relates to techniques for detecting and processing a software system fault, and in particularly, to a method, a device, and a computer readable storage medium for detecting and processing a system fault.

BACKGROUND

During startup and running of software systems, faults such as system hardware hanging, operating system crash, task abnormity, task dead loop, frequent interruption and so on, often occur, causing the systems not to work. For software in a communication system, when a fault occurs in the software system, the software system can automatically identify status of task abnormity, and correspondingly alarm fault abnormity, perform recording and system recovery according to user configuration policy, which are essential functions. Especially for those voice service enabled systems with high real-time requirement, if any fault occurs at any stage of system operation, the system is required to be able to completely and accurately identify the abnormity, record abnormity information and perform automatic recovery processing.

In existing methods of fault detection and automatic recovery in the software system, a hardware watchdog or a software watchdog is generally employed. A hardware watchdog is a simple timer reset device, for which software is required to regularly generate a pulse kicking dog signal. Once a timing threshold (usually 1-2 seconds) is exceeded without generating a pulse kicking dog signal, it will automatically generate a hardware reset signal to trigger the system to reset. The software watchdog aims to solve the problem of short timing in the hardware watchdog. The software watchdog may increase reset time of the hardware watchdog by means of some simple heartbeat messages or a synchronous monitoring mechanism. These methods are simple to be implemented and relatively reliable. They, however, have their own drawbacks. For example, not all abnormities arising in the system can be detected, some special applications in the system cannot be monitored and the types of the system faults cannot be classified in a log record.

SUMMARY

In order to solve the issues in the prior art, embodiments of the present disclosure provide a method, a device, and a computer readable storage medium for detecting and processing a system fault.

In one aspect, an embodiment of the present disclosure provides a method for detecting and processing a system fault. The method includes:

an interrupt service routine sends a first stage kicking dog signal, and receives a second stage kicking dog signal for a system detection task; and when task dead loop or task abnormity is detected, system abnormity processing is performed according to a preset processing policy; wherein when the interrupt service routine fails to receive the second stage kicking dog signal within a set period of time, the interrupt service routine stops sending the first stage kicking dog signal, and the system reboots.

When operating system breakdown or hardware abnormity occurs in the system, the system automatically reboots for recovery.

When an interrupt exceeds a set threshold, a task with a higher priority over the system detection task is busy, system abnormity occurs during startup of the system or the system detection task suspends due to abnormity in itself, the interrupt service routine fails to receive the second stage kicking dog signal.

The detection of the task dead loop may include:

timing, by the system detection task, a second stage software kicking dog, and timing, by a low priority dead loop auxiliary task, a keep-alive maintaining for the dead loop;

calculating CPU occupation ratio periodically;

determining whether the calculated CPU occupation ratio is higher than a CPU dead loop determining threshold; if the calculated CPU occupation ratio is not higher than the CPU dead loop determining threshold, determining that no task dead loop occurs; if the calculated CPU occupation ratio is higher than the CPU dead loop determining threshold, determining whether the low priority dead loop auxiliary task is set to be keep-alive; if the low priority dead loop auxiliary task is set to be keep-alive, determining that no task dead loop occurs; otherwise, alarming and notifying maintenance personnel for analysis; and determining whether the system detection task handled only one message during a sample detection period, if the system detection task handled a plurality of messages during the sample detection period, alarming and notifying maintenance personnel for analysis; if the system detection task handled only one message during the sample detection period, determining that the task is in a state of dead loop.

The detection of the task abnormity may include:

detecting working state of all tasks periodically; and performing the task abnormity detection according to the detected working state in conjunction with a pre-configured task abnormity determination policy.

In another aspect, an embodiment of the present disclosure provides a device for detecting and processing a system fault. The device includes:

a signal processing module configured to cause an interrupt service routine to send a first stage kicking dog signal, and receive a second stage kicking dog signal of a system detection task; and an abnormity processing module configured to, when task dead loop or task abnormity is detected, perform system abnormity processing according to a preset processing policy; wherein, when the interrupt service routine fails to receive the second stage kicking dog signal within a set period of time, cause the interrupt service routine to stop sending the first stage kicking dog signal and causes the system to reboot.

The device may further include:

an automatic rebooting module configured to, when operating system breakdown or hardware abnormity occurs in system, reboot the system automatically for recovery.

When an interrupt exceeds a set threshold, a task with a higher priority over the system detection task is busy, system abnormity occurs during startup of the system or the system detection task suspends due to abnormity in itself, the interrupt service routine fails to receive the second stage kicking dog signal.

The device may further include:

a CPU occupation ratio calculating module configured to, when the system detection task times a second stage software kicking dog, and a low priority dead loop auxiliary task times keep-alive maintaining for the dead loop, calculate central processing unit (CPU) occupation ratio periodically; and a task dead loop detection module configured to, if the system detection task determines that the calculated CPU occupation ratio is not higher than a CPU dead loop determining threshold, determine that no task dead loop occurs in the above task; if the system detection task determines that the calculated CPU occupation ratio is higher than a CPU dead loop determining threshold, determine whether the low priority dead loop auxiliary task is set to be keep-alive; if the low priority dead loop auxiliary task is set to be keep-alive, determine that no task dead loop occurs; otherwise, alarm and notify maintenance personnel for analysis; and wherein the task dead loop detection module is further configured to determine whether the system detection task handled only one message during a sample detection period, if the system detection task handled a plurality of messages during the sample detection period, alarm and notify maintenance personnel for analysis; if the system detection task handled only one message during the sample detection period, determine that the task is in a state of dead loop.

Preferably, the device may further include:

a task working state detecting module configured to detect working state of all tasks periodically;

a task abnormity detection module configured to perform the task abnormity detection according to the detected working state in conjunction with a pre-configured task abnormity determination policy.

An embodiment of the present disclosure also provides a computer-readable storage medium having a set of computer executable instruction for executing the method for detecting and processing a system fault according to the embodiments of the present disclosure.

The embodiments of the present disclosure may have the following advantageous effects.

According to the embodiments of the present disclosure, automatic fault detection for a software system may be achieved, and the system can be automatically recovered according to the user strategy. The system abnormities in the processes of both the system startup and the system running can be simultaneously detected and automatic recovery can be achieved. Types of abnormities in the process of the system running can be classified and identified and automatically recovered according to user strategy. In addition, the system abnormity detection and the automatic recovery strategy may be configured by the user, and the cause of abnormity may be recorded and queried.

DETAILED DESCRIPTION

The present disclosure will be described in further detail below by specific embodiments in conjunction with the accompanying drawings. It is noted that the specific embodiments described here are used merely to illustrate the present disclosure, and do not limit the scope of the present disclosure.

Figure 1:
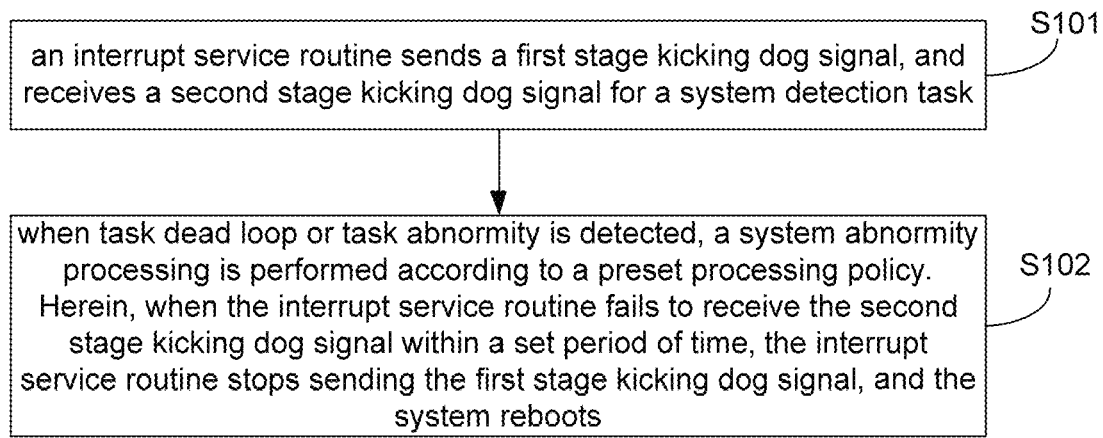
FIG. 1 is a flowchart of a method for detecting and processing a system fault according to an embodiment of the present disclosure.

As shown in FIG. 1, an embodiment of the present disclosure relates to a method for detecting and processing a system fault. The method includes following steps.

In step S101, an interrupt service routine sends a first stage kicking dog signal, and receives a second stage kicking dog signal for a system detection task.

In this step, the interrupt service routine normally kicks the hardware watchdog at the first stage (i.e., sending a first stage kicking dog signal), and when operating system breakdown or hardware abnormity occurs in the system, the interrupt service routine cannot work and the hardware watchdog automatically resets.

The system starts up, and the interrupt service routine starts to kick the first stage hardware watchdog. After a system detection task with a high priority starts up, the system detection task starts to kick a software watchdog at the second stage (i.e., sending a second stage kicking dog signal). If a system abnormity occurs during the startup of the system, the second stage software kicking dog may not be completed in time. Thus, the first stage hardware kicking dog will be stopped, and the system may log a startup abnormity and automatically resets at the same time.

After the system starts up, the system detection task with the high priority operates normally. When an interrupt exceeds a set threshold (frequent interruption), or a task with a higher priority over the system detection task is busy, the second stage software kicking dog may not be completed in time. Thus, the first stage hardware kicking dog will be stopped, and the system may log and automatically reset. In addition, if the system detection task (with high priority) suspends due to abnormity in itself, the second stage software kicking dog also will not be achieved. Thus, the first stage hardware kicking dog will be stopped, and the system may log and automatically reset. Herein, a task with a higher priority over the system detection task being busy means that the central processing unit (CPU) occupation by the task with a higher priority over the system detection task exceeds a predetermined threshold value.

In step S102, when task dead loop or task abnormity is detected, a system abnormity processing is performed according to a preset processing policy. Herein, when the interrupt service routine fails to receive the second stage kicking dog signal within a set period of time, the interrupt service routine stops sending the first stage kicking dog signal, and the system reboots.

In this step, the detecting of the task dead loop may include: periodically calculating CPU occupation ratio by the task; and determining a task dead loop according to a pre-configured CPU dead loop determination threshold and a dead loop determination strategy. The task dead loop determination strategy may be pre-configured by the user according to characteristics of the tasks, application environment and other factors. Generally, when the CPU occupation ratio by a task exceeds the CPU dead loop determination threshold, it is considered that a task dead loop occurs. Certainly, exceptions also may be set. For example, there may be a low priority dead loop auxiliary task. This task may allow the CPU occupation ratio by other tasks to exceed the CPU dead loop determination threshold (a embedded system allows some of the low priority tasks, for example, the idle task always is busy, but it has no effect on the normal function of the system). The CPU occupation ratio by tasks in an especially busy task list is allowed to exceed the CPU dead loop determination threshold (some critical task may be very busy during a certain period of time when running some functions, which should not be considered as task in an abnormally busy state). In addition, a step of task dead loop determination is also needed to be performed, i.e., only if a task dead loop is determined for at least two sampling times, it can be determined that this task is in a dead loop.

The detecting of the task abnormity may include: detecting working state of all tasks periodically; and performing the task abnormity determination according to the task abnormity determination strategy. The task abnormity determination strategy may be pre-configured by the user according to the actual conditions. For example, only when a critical task is determined to be in an abnormity state (a critical task refers to a task in which an abnormity will affect the basic functions of the system and must be recovered immediately. The critical task may be dynamically configured), an automatic recovery (reboot) operation will be performed. Automatic recovery operations also may be performed when it is determined that an abnormity occurs in each normal task. In addition, no automatic recovery operation may be performed for each task abnormity. The task abnormity detection also may include a step of task abnormity determination, i.e., only if a task abnormity is determined for at least two sampling times, it can be determined that task abnormity occurs.

The automatic recovery processing for the system may include: determining whether to reset immediately after the system abnormity (the task dead loop or the task abnormity); if yes, resetting the system immediately; otherwise, waiting for system automatic recovery waiting time, which may be pre-configured; after the system automatic recovery waiting time, determining whether the reset condition is satisfied; if the reset condition is satisfied, resetting the system immediately; otherwise, resetting the system until a default period of time passes; if the system fails to be reset due to abnormity, sending an alert or recording a log. The log of system abnormity may include: recording a log into memory or a file system.

A specific embodiment will be presented below for further detailed description.

In accordance with an embodiment of the present disclosure, a flow during a system startup or normal running may include the following steps.

In step S201, the system starts up, an interrupt service routine starts to work and configures a default number for counting interruption. The default number may be determined based on the time spent in the system startup. For example, if the time spent in the system startup is 5 minutes and the time of each interruption is 10 ms, the number for counting interruption is 5*60*1000/10=30000.

In step S202, when each interruption is coming, the number for counting interruption is decreased by 1, and the interrupt service routine kicks the hardware watchdog at the first stage. If the interrupt service routine cannot work due to system hardware abnormity, operating system breakdown and the like at this time, the first stage hardware kicking dog will be stopped, and the system reboots.

Since kicking dog threshold for a hardware watchdog is typically 1-2 seconds, in order to ensure that the system can work properly, it must pay attention to shut of the interruption for other task during the system startup. If the time for shutting the interruption is long (exceeding the kicking dog threshold), a kicking dog point is needed to be added in codes, i.e., a first stage kicking dog is performed while shutting the interruption to prevent normal interruption shutting from causing the system to reboot.

In addition, every time when a interruption is coming, it determines whether the number for counting interruption is greater than 0. If the number is greater than 0, it waits for a next interruption until the system detection task starts up, and proceeds to step S203. Otherwise (i.e., the number equals to 0), it indicates that the high priority system detection task does not start to work as usual (i.e., an abnormity occurs during the system startup), which means in this case that a second stage software kicking dog fails. Then, a startup abnormity is recorded as the reason. The first stage hardware kicking dog is stopped and the system reboots.

In step S203, a high priority system detection task starts to time a second stage software kicking dog, and resets the number for counting interruption. The number for counting interruption is determined based on timeliness for determining task dead loop during normal system operation. If the requirement for timeliness in determining task dead loop is high, a smaller value may be set, otherwise a greater value may be set. For example, if the time required in the system for the second stage software kicking dog is 3 min and the time of each interruption is 10 ms, the number for counting interruption is 3×60×1000/10=18000.

For the time of the second stage software kicking dog timing of the high priority system detection task, an empirical value may be derived from the number for counting interruption. For example, it can be configured that performing a second stage software kicking dog once every 30 seconds.

In step S204, when a task with a higher priority over the system detection task with a high priority is busy, interruption occurs over frequently, or a higher priority task suspends, i.e., there is no second stage software kicking dog for 3 min, the number for counting interruption equals to 0, and the higher priority task is considered to be busy. Then, the reason is recorded, the first stage hardware kicking dog is stopped and the system will reboot.

In the method according to the embodiments of the present disclosure, a flow for task dead loop detection and automatic recovery in process of system normal operation may include the following steps.

In step S301, a high priority system detection task and a low priority dead loop auxiliary task start up; the high priority system detection task times a second stage software kicking dog, and the low priority dead loop auxiliary task times keep-alive maintaining for the dead loop. In this step, the high priority and the low priority is relative, i.e., the priority of system detection task is higher than the priority of dead loop auxiliary task.

In step S302, the high priority system detection task calculates the CPU occupation ratio by tasks once every 1 minute (calculating the CPU occupation ratio by tasks in a running status).

In step S303, the high priority system detection task determines whether the calculated CPU occupation ratio by tasks is greater than a CPU dead loop determining threshold (which may be pre-configured manually by user according to condition of the system); if no, it is determined that this task is not in a dead loop; if yes, it proceeds to step S304.

In step S304, when it is determined that CPU occupation ratio by a task is greater than the CPU dead loop determining threshold, it further determines whether the low priority dead loop auxiliary task is set to be keep-alive; if yes, i.e., the low priority dead loop auxiliary task is set to be keep-alive, then it indicates that this task can be scheduled normally by the system, there is no dead loop in the system, and the tasks with a lower priority than the low priority dead loop auxiliary task will not be considered in determining dead loop; and if no, it proceeds to step S305.

In step S305, if the low priority dead loop auxiliary task is not set with a keep-alive identifier, it can not determine that this task is in a dead loop, because there are some tasks that are always running in the period of the high priority task timing detection. Thus, these special tasks in the system are needed to be excluded because they may be busy as usual which cannot be considered as in a dead loop. However, this case needs to be notified maintenance personnel for further analysis. The above special tasks may be pre-configured manually by the user.

In step S306, the above step can determine that a dead loop task is in the system, and it further needs to determine whether the high priority system detection task only handled one message during a regular sample detection period. If the system detection task simultaneously handled multiple messages during a regular sample period, it indicates that this task can be scheduled normally by the system and there is no dead loop in the system, but it needs to notify maintenance personnel for further analysis. If the system detection task only handled one message during a regular sample period, it determines that this task is in a dead loop.

In step S307, when there is a task dead loop in the system, a dead loop determination is performed after waiting for one sample period again, a log is recorded after this determination, and a reboot recovery is prepared. However, it needs to determine whether an important task (such as a file system operation) is running in the system before rebooting. If the system cannot reboot immediately due to an important task being running in the system, it allows the system to force the important task to close after a delay and reboot.

In the method according to the embodiments of the present disclosure, a flow for task abnormity detection and automatic recovery in process of a system normal operation may include the following steps.

In step S401, a high priority system detection task starts to time a second stage software kicking dog.

In step S402, the high priority system detection task detects working state of all tasks in the system every 1 minute (a detection period).

In step S403, the high priority system detection task detects that a task suspends due to abnormity, and it determines whether this task is a critical task or a common task. The system performs the automatic recovery operation according to abnormity detection processing strategy configured by the user. For example, the abnormity detection processing strategy may include: allowing a critical task in abnormity to reboot, allowing a common task in abnormity to reboot, or all the tasks are not allowed to reboot. Herein, the critical task is pre-configured by the user. If these tasks can not work, important functions of the system will be affected.

In step S404, when it is determined that there is a task abnormity in the system, the system needs to record stack information for the abnormal task and a log, and reboots for recovery. However, it needs to determine whether an important task (such as a file system operation) is running in the system before rebooting. If the system cannot reboot immediately due to an important task being running in the system, it allows the system to force the important task to close after a delay and reboot.

Figure 2:
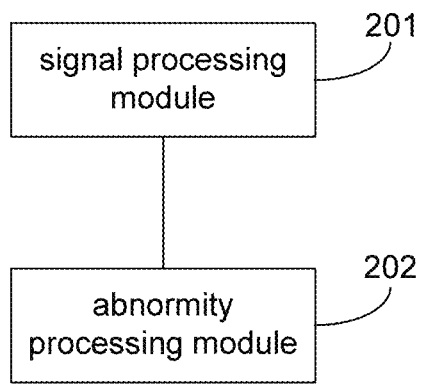
FIG. 2 is a schematic structure diagram of a device for detecting and processing a system fault according to an embodiment of the present disclosure.

In addition, as shown in FIG. 2, an embodiment of the present disclosure also provides a device for implementing the above method and for detecting and processing a system fault. The device includes the following modules.

A signal processing module 201 may be configured to cause an interrupt service routine to send a first stage kicking dog signal, and receive a second stage kicking dog signal from a system detection task. When the number of interrupts exceeds a set threshold, a task with a higher priority over the system detection task is busy, system abnormity occurs during system startup or the system detection task suspends due to abnormity in itself, the second stage kicking dog signal is not received by the interrupt service routine.

An abnormity processing module 202 may be configured to, when task dead loop or task abnormity is detected, perform system abnormity processing according to a preset processing policy. Herein, when the interrupt service routine fails to receive the second stage kicking dog signal within a set period of time, the abnormity processing module 202 causes the interrupt service routine to stop sending the first stage kicking dog signal and causes the system to reboot.

In an implementation, the above device may further include the following modules.

An automatic rebooting module may be configured to, when operating system breakdown or hardware abnormity occurs in system, reboot the system automatically for recovery.

A CPU occupation ratio calculating module may be configured to, when the system detection task times a second stage software kicking dog, and a low priority dead loop auxiliary task times keep-alive maintaining for the dead loop, calculate CPU occupation ratio periodically.

A task dead loop detection module may be configured to, if the system detection task determines that the calculated CPU occupation ratio is not higher than a CPU dead loop determining threshold, determine that no task dead loop occurs in the above task; if the system detection task determines that the calculated CPU occupation ratio is higher than the CPU dead loop determining threshold, determine whether the low priority dead loop auxiliary task is set to be keep-alive; if the low priority dead loop auxiliary task is set to be keep-alive, determine that no task dead loop occurs; otherwise, alarm and notify maintenance personnel for analysis; determine whether the system detection task handled only one message during a sample detection period, if the system detection task handled a plurality of messages during a sample detection period, alarm and notify maintenance personnel for analysis; if the system detection task only handled one message during a sample detection period, determine that the task is in a dead loop.

A task working state detecting module may be configured to detect working state of all tasks periodically.

A task abnormity detection module may be configured to perform the task abnormity detection according to the detected working state in conjunction with a pre-configured task abnormity determination strategy.

In an implementation, the above modules may be implemented by a CPU, a Micro Processing Unit (MPU), a Digital Signal Processor (DSP), or a Field Programmable Gate Array (FPGA) in the device for detecting and processing system fault.

Generally, according to the embodiments of the present disclosure, by regular automatic scanning detection in conjunction with interruption and kicking watchdog, it can determine an abnormal condition such as task dead loop and task abnormity, and also can determine a condition of frequent interruption and hardware/software hanging in a system. Also, the reasons may be classified to log according to types of these abnormities and automatic delay recovery processing is performed. Both the special operational tasks of the systems and dynamic configuration requirements for the different systems are taken into account. The conditions of software operation can also be detected during system startup, which satisfies the most requirements for abnormity detection and automatic recovery in a software system.

Those skilled in the art should understand that the embodiments of the present disclosure may be provided as a method, a system or a computer program product. Therefore, the present disclosure may be implemented in a form of hardware, software, or a combination thereof. Also, the present disclosure may be employed in a form of a computer program product implemented on one or more computer available storage medium (including, but not limited to, disk storage and optical storage) having computer available program codes stored thereon.

The present disclosure is described with reference to flow charts and/or block diagrams according to a method, a device (system) and a computer program product of the embodiments of the present disclosure. It should be appreciated that each flow and/or block in the flow charts and/or block diagrams and a combination thereof may be implemented by computer program instructions. These computer program instructions may be provide to a general-purpose computer, a dedicated computer, an embedded processor, or a processor of other programmable data processing device to produce a machine such that the instructions can be processed by a processor of a computer or other programmable data processing device to produce a device for implementing the functions designated in one or more flows of the flow charts and/or one or more blocks of the block diagrams.

These computer program instructions also may be stored in a computer readable storage that can make a computer or other programmable data processing device to operate in a particular manner such that an article of manufacture including an instruction device may be produced by the instructions stored in the computer readable storage. This instruction device may implement the functions designated in one or more flows of the flow charts and/or one or more blocks of the block diagrams.

These computer program instructions also may be loaded on a computer or other programmable data processing device such that a series of operational steps can be executed on the computer or other programmable data processing device to produce a process implemented by the computer. Thus, the instructions executed on the computer or other programmable data processing device can provide steps for implementing the functions designated in one or more flows of the flow charts and/or one or more blocks of the block diagrams.

As such, an embodiment of the present disclosure also provides a computer-readable storage medium having a set of computer executable instructions for executing the method for detecting and processing a system fault according to the embodiments of the present disclosure.

Although preferred embodiments of the present disclosure have been disclosed for the purposes of illustration, those skilled in the art will appreciate that various modifications, additions and substitutions are possible. Therefore, the scope of the invention should not be limited to the embodiments described above.

What is claimed is:

1. A method for detecting and processing a system fault, comprising:

sending, by an interrupt service routine, a first stage kicking dog signal, and receiving a second stage kicking dog signal for a system detection task; and when task dead loop or task abnormity is detected, performing system abnormity processing according to a preset processing policy, wherein when the interrupt service routine fails to receive the second stage kicking dog signal within a set period of time, the interrupt service routine stops sending the first stage kicking dog signal, and the system reboots.

2. The method according to claim 1, further comprising: when operating system breakdown or hardware abnormity occurs in the system, automatically rebooting, by the system, for recovery.

3. The method according to claim 1, wherein when an interrupt exceeds a set threshold, a task with a higher priority over the system detection task is busy, system abnormity occurs during startup of the system or the system detection task suspends due to abnormity in itself, the interrupt service routine fails to receive the second stage kicking dog signal.

4. The method according to claim 3, wherein the detection of the task dead loop comprises:

timing, by the system detection task, a second stage software kicking dog, and timing, by a low priority dead loop auxiliary task, a keep-alive maintaining for the dead loop;

calculating CPU occupation ratio periodically;

determining whether the calculated CPU occupation ratio is higher than a CPU dead loop determining threshold; in the case that the calculated CPU occupation ratio is not higher than the CPU dead loop determining threshold, determining that no task dead loop occurs; in the case that the calculated CPU occupation ratio is higher than the CPU dead loop determining threshold, determining whether the low priority dead loop auxiliary task is set to be keep-alive; in the case that the low priority dead loop auxiliary task is set to be keep-alive, determining that no task dead loop occurs; otherwise, alarming and notifying maintenance personnel for analysis; and determining whether the system detection task handled only one message during a sample detection period; in the case that the system detection task handled more than one message during the sample detection period, alarming and notifying maintenance personnel for analysis; otherwise, determining that the task dead loop occurs.

5. The method according to claim 1, wherein the detection of the task abnormity comprises:

detecting working state of all tasks periodically; and performing the task abnormity detection according to the detected working state in conjunction with a pre-configured task abnormity determination policy.

6. The method according to claim 2, wherein when an interrupt exceeds a set threshold, a task with a higher priority over the system detection task is busy, system abnormity occurs during startup of the system or the system detection task suspends due to abnormity in itself, the interrupt service routine fails to receive the second stage kicking dog signal.

7. The method according to claim 2, wherein detecting the task abnormity comprises:

detecting working state of all tasks periodically; and performing the task abnormity detection according to the detected working state in conjunction with a pre-configured task abnormity determination policy.

8. The method according to claim 4, wherein detecting the task abnormity comprises:
  detecting working state of all tasks periodically; and
  performing the task abnormity detection according to the detected working state in conjunction with a pre-configured task abnormity determination policy.

9. A device for detecting and processing a system fault, comprising:
  a signal processing module configured to cause an interrupt service routine to send a first stage kicking dog signal, and receive a second stage kicking dog signal for a system detection task; and
  an abnormity processing module configured to, when task dead loop or task abnormity is detected, perform system abnormity processing according to a preset processing policy, wherein, when the interrupt service routine fails to receive the second stage kicking dog signal within a set period of time, the abnormity processing module causes the interrupt service routine to stop sending the first stage kicking dog signal and causes the system to reboot.

10. The device according to claim 9, further comprising:
  an automatic reboot module configured to, when operating system breakdown or hardware abnormity occurs in the system, reboot the system automatically for recovery.

11. The device according to claim 9, wherein when an interrupt exceeds a set threshold, a task with a higher priority over the system detection task is busy, system abnormity occurs during startup of the system or the system detection task suspends due to abnormity in itself, the interrupt service routine fails to receive the second stage kicking dog signal.

12. The device according to claim 11, further comprising:
  a CPU occupation ratio calculation module configured to, when the system detection task times a second stage software kicking dog, and a low priority dead loop auxiliary task times keep-alive maintaining for the dead loop, calculate CPU occupation ratio periodically; and
  a task dead loop detection module configured to, in the case that the system detection task determines that the calculated CPU occupation ratio is not higher than a CPU dead loop determining threshold, determine that no task dead loop occurs; in the case that the system detection task determines that the calculated CPU occupation ratio is higher than the CPU dead loop determining threshold, determine whether the low priority dead loop auxiliary task is set to be keep-alive; in the case that the low priority dead loop auxiliary task is set to be keep-alive, determine that no task dead loop occurs; otherwise, alarm and notify maintenance personnel for analysis; and
  wherein the task dead loop detection module is further configured to determine whether the system detection task handled only one message during a sample detection period; in the case that the system detection task handled more than one message during the sample detection period, alarm and notify maintenance personnel for analysis; otherwise, determine that the task dead loop occurs.

13. The device according to claim 9, further comprising:
  a task working state detection module configured to detect working state of all tasks periodically; and
  a task abnormity detection module configured to perform the task abnormity detection according to the detected working state in conjunction with a pre-configured task abnormity determination policy.

14. The device according to claim 10, wherein when an interrupt exceeds a set threshold, a task with a higher priority over the system detection task is busy, system abnormity occurs during startup of the system or the system detection task suspends due to abnormity in itself, the interrupt service routine fails to receive the second stage kicking dog signal.

15. The device according to claim 10, further comprising:
  a task working state detection module configured to detect working state of all tasks periodically; and
  a task abnormity detection module configured to perform the task abnormity detection according to the detected working state in conjunction with a pre-configured task abnormity determination policy.

16. The device according to claim 12, further comprising:
  a task working state detection module configured to detect working state of all tasks periodically; and
  a task abnormity detection module configured to perform the task abnormity detection according to the detected working state in conjunction with a pre-configured task abnormity determination policy.

17. A non-transitory computer-readable storage medium comprising a set of computer executable instructions for executing the method according to claim 1.

* * * * *